United States Patent
Jung et al.

(10) Patent No.: US 9,116,754 B2
(45) Date of Patent: Aug. 25, 2015

(54) HIERARCHICAL SCHEDULING APPARATUS AND METHOD FOR CLOUD COMPUTING

(71) Applicant: Samsung Electronics Co., Ltd., Suwon-si (KR)

(72) Inventors: Eun-Sung Jung, Seongnam-si (KR); Bon-Cheol Gu, Seongnam-si (KR); Kyung-Ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 13/733,627

(22) Filed: Jan. 3, 2013

(65) Prior Publication Data
US 2013/0174174 A1    Jul. 4, 2013

(30) Foreign Application Priority Data
Jan. 3, 2012    (KR) .................. 10-2012-0000610

(51) Int. Cl.
*G06F 9/46*    (2006.01)
*G06F 9/50*    (2006.01)

(52) U.S. Cl.
CPC ............ *G06F 9/5083* (2013.01); *G06F 9/5072* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | |
|---|---|---|---|
| 6,694,345 B1* | 2/2004 | Brelsford et al. | 718/100 |
| 2004/0073908 A1* | 4/2004 | Benejam et al. | 718/105 |
| 2004/0107240 A1* | 6/2004 | Zabarski et al. | 709/201 |
| 2004/0199918 A1* | 10/2004 | Skovira | 718/102 |
| 2008/0163219 A1* | 7/2008 | Marwinski | 718/101 |
| 2009/0094605 A1* | 4/2009 | Brelsford et al. | 718/100 |

* cited by examiner

*Primary Examiner* — Adam Lee
(74) *Attorney, Agent, or Firm* — NSIP Law (57) ABSTRACT

A hierarchical scheduling apparatus for a cloud environment includes a schedule configuring unit configured to classify a plurality of tasks into one or more local tasks and one or more remote tasks; a schedule delegating unit configured to transmit, to another resource, a list of the remote tasks and a list of available resources to delegate scheduling authority for the remote tasks to the other resource; and a scheduling unit configured to schedule the local tasks.

20 Claims, 8 Drawing Sheets

ROOT RESOURCE(R1)

APPLICATION
TASK GRAPH

HIERARCHICAL SCHEDULING APPARATUS AND METHOD FOR CLOUD COMPUTING

CROSS-REFERENCE TO RELATED APPLICATIONS

This application claims the benefit under 35 USC 119 of Korean Patent Application No. 10-2012-0000610 filed on Jan. 3, 2012, in the Korean Intellectual Property Office, the entire disclosure of which is incorporated herein by reference for all purposes.

BACKGROUND

1. Field

The following description relates to a technique for hierarchically scheduling application programs using cloud resources in a cloud environment.

2. Description of Related Art

In general, a mobile terminal executes application programs by enabling an OS scheduler to allocate resources to the application programs. However, when a mobile terminal uses cloud resources, such as cloud computing, or when a mobile terminal uses computing resources of nearby devices, such as a CPU, a storage, a sensor, and a display, the scheduling becomes complicated.

Recently, studies into distributed computing techniques for using all users' own IT devices that support N-Screen, other users' resources, such as peer-to-peer (P2P) and mobile crowd sensing, and shared resources, such as Cloudlet and public sensors, have been actively conducted.

SUMMARY

In one general aspect, a hierarchical scheduling apparatus for a cloud environment includes a schedule configuring unit configured to classify a plurality of tasks into one or more local tasks and one or more remote tasks; a schedule delegating unit configured to transmit, to another resource, a list of the remote tasks and a list of available resources to delegate scheduling authority for the remote tasks to the other resource; and a scheduling unit configured to schedule the local tasks.

The hierarchical scheduling apparatus may further include a resource manager configured to collect state information of other resources; and the schedule configuring unit may be further configured to determine whether the other resources are available based on the collected state information of the other resources, and allocate the remote tasks to at least one available resource of the other resources.

The state information of the other resources may include information regarding a scheduling time according to a computing performance of each of the other resources, or information regarding a remaining battery capacity of each of the other resources, or ownership information of each of the other resources, or any combination thereof.

The resource manager may be further configured to detect a change in a state of the hierarchical scheduling apparatus; and the hierarchical scheduling apparatus may further include a reconfiguration deciding unit configured to decide, when the resource manager detects a change in the state of the hierarchical scheduling apparatus, whether to request the schedule configuring unit to reallocate the tasks, or whether to request a predetermined resource to reconfigure a schedule; and a reconfiguration requesting unit configured to request the schedule configuring unit to reallocate the tasks, or to request the predetermined resource to reconfigure the schedule, depending on a decision of the reconfiguration deciding unit.

The hierarchical scheduling apparatus may further include a schedule receiving unit configured to receive information about the predetermined resource from an upper resource that has delegated scheduling authority for the tasks to the hierarchical scheduling apparatus.

The predetermined resource may be an upper resource that has delegated scheduling authority for the tasks to the hierarchical scheduling apparatus, or an upper resource of the upper resource, or a most significant resource.

The other resource may include a shared sensor, or a mobile terminal, or a cloud server, or any combination thereof, connected to the hierarchical scheduling apparatus through a wired network, or a wireless network, or a combination of a wired network and a wireless network.

In another general aspect, a hierarchical scheduling method for a cloud environment includes classifying a plurality of tasks into one or more local tasks and one or more remote tasks; transmitting, to another resource, a list of the remote tasks and a list of available resources to delegate scheduling authority for the remote tasks to the other resource; and scheduling the local tasks.

The hierarchical scheduling method may further include collecting state information of other resources; and the classifying of the plurality of tasks may include determining whether the other resources are available based on the collected state information of the other resources; and allocating the remote tasks to at least one available resource of the other resources.

The hierarchical scheduling method may further include detecting a change in a state of a resource performing the hierarchical scheduling method; deciding, when a change in the state of the resource performing the hierarchical scheduling method is detected, whether to reallocate the tasks, or whether to request a predetermined resource to reconfigure a schedule; and reallocating the tasks, or requesting the predetermined resource to reconfigure the schedule, depending on a result of the deciding.

In another general aspect, a hierarchical scheduling apparatus for a cloud environment includes a schedule configuring unit configured to allocate remote tasks to a lower resource of the hierarchical scheduling apparatus, receive a request to reconfigure a schedule from the lower resource, and reconfigure the schedule by reallocating at least some of the remote tasks to another resource; and a schedule delegating unit configured to delegate scheduling authority for the at least some of the remote tasks to the other resource.

The schedule configuring unit may be further configured to allocate at least some of the remote tasks to the hierarchical scheduling apparatus as local tasks; and the hierarchical scheduling apparatus may further include a scheduling unit configured to schedule the local tasks.

The schedule configuring unit may be further configured to allocate local tasks to the hierarchical scheduling apparatus; and the hierarchical scheduling apparatus may further include a scheduling unit configured to schedule the local tasks.

The hierarchical scheduling apparatus may further include a schedule receiving unit configured to receive a list of tasks and a list of resources from an upper resource that has delegated scheduling authority for the tasks in the list of tasks to the hierarchical scheduling apparatus; and the schedule configuring unit may be further configured to classify the tasks in the list of tasks into the local tasks and the remote tasks.

The hierarchical scheduling apparatus may further include a reconfiguration deciding unit configured to decide, when a state of the hierarchical scheduling apparatus has changed, whether to request the schedule configuring unit to reallocate at least some of the local tasks to the lower resource of the hierarchical scheduling apparatus, or whether to request a predetermined resource to reconfigure a schedule; and a reconfiguration requesting unit configured to request the schedule configuring unit to reallocate the at least some of the local tasks, or to request the predetermined resource to reconfigure the schedule, depending on a decision of the reconfiguration deciding unit.

The hierarchical scheduling apparatus may further include a resource manager configured to collect state information of the hierarchical scheduling apparatus; and the reconfiguration deciding unit may be further configured to detect that a state of the hierarchical scheduling apparatus has changed based on the state information of the hierarchical scheduling apparatus.

The hierarchical scheduling apparatus may further include a resource manager configured to collect state information of a plurality of resources; and the schedule configuring unit may be further configured to allocate the remote tasks and reallocate the at least some of the remote tasks based on the state information collected by the resource manager.

The state information collected by the resource manager may include state information of the hierarchical scheduling apparatus; and the hierarchical scheduling apparatus may further include a reconfiguration deciding unit configured to detect whether a state of the hierarchical scheduling apparatus has changed based on the state information of the hierarchical scheduling apparatus, and decide, when the reconfiguration deciding unit detects that the state of the hierarchical scheduling apparatus has changed, whether to request the schedule configuring unit to reconfigure the schedule by reallocating the at least some of the remote tasks to the other resource, or whether to request a predetermined resource to reconfigure the schedule; and a reconfiguration requesting unit configured to request the schedule configuring unit to reallocate the at least some of the remote tasks to the other resource, or to request the predetermined resource to reconfigure the schedule, depending on a decision of the reconfiguration deciding unit.

Other features and aspects will be apparent from the following detailed description, the drawings, and the claims.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same drawing reference numerals refer to the same elements. The relative size and depiction of these elements may be exaggerated for clarity, illustration, and convenience.

Figure 1:
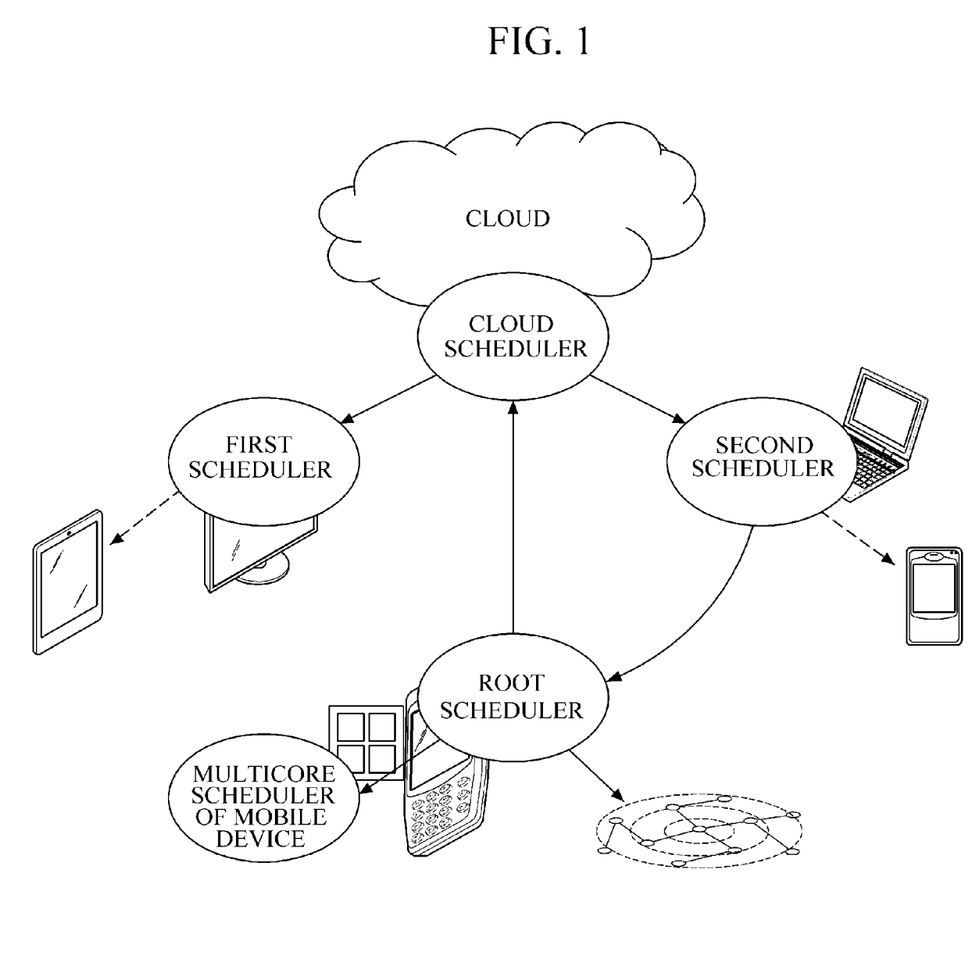
FIG. 1 is a diagram illustrating an example of a hierarchical scheduling system for a cloud environment.

FIG. 1 is a diagram illustrating an example of a hierarchical scheduling system for a cloud environment. FIG. 1 will be used to explain an example of a method in which a root scheduler of a mobile device uses a task graph of an application program to delegate scheduling authority for tasks to its own multi-core scheduler, a cloud scheduler of a cloud server, and a first scheduler and a second scheduler of other resources. This enables application programs that heretofore have been executed in a mobile terminal to be distributively scheduled by nearby available computing resources and one or more clouds to reduce the execution time of the application programs, or reduce the amount of energy used by the mobile terminal, or both.

A hierarchical scheduling method in this example is not a method in which a root resource delegates scheduling authority for all tasks to lower resources, but a method in which a root resource allocates some tasks to its own scheduler and delegates scheduling authority for the remaining tasks to a cloud scheduler so the cloud scheduler can redelegate some of the delegated tasks to a first scheduler resource and a second scheduler resource.

Available computing resources may include a cloud server, a shared sensor, a mobile terminal, and any other device that can be connected to the hierarchical scheduling apparatus through a wired network, or a wireless network, or a combination of a wired network and a wireless network. A root scheduler is the most significant resource scheduler, i.e., the scheduler that is the highest in a hierarchy of schedulers, and is a scheduler that initially delegates scheduling authority to other resources.

Figure 2:
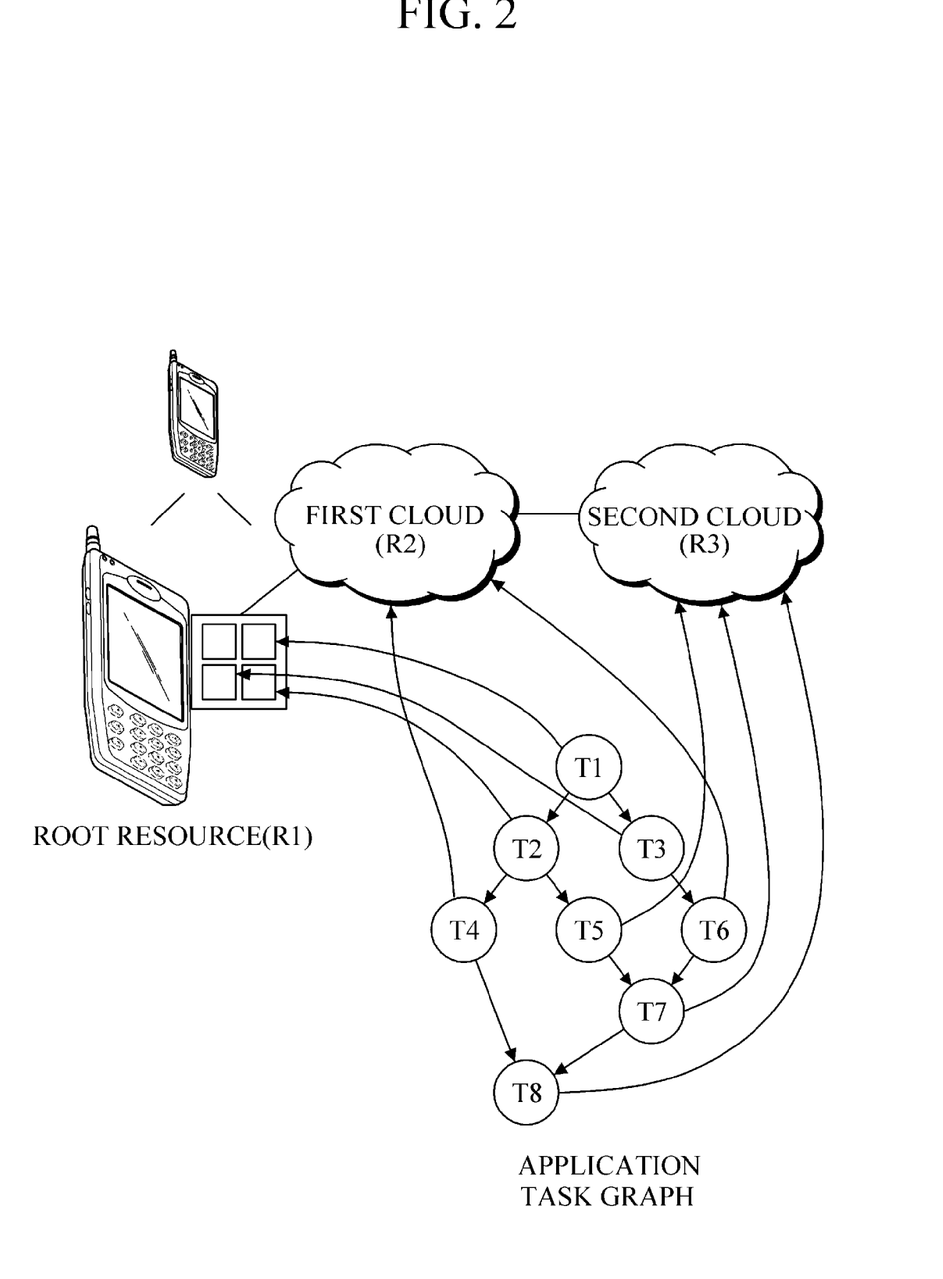
FIG. 2 shows an example of a task graph of an application program.
Figure 3:
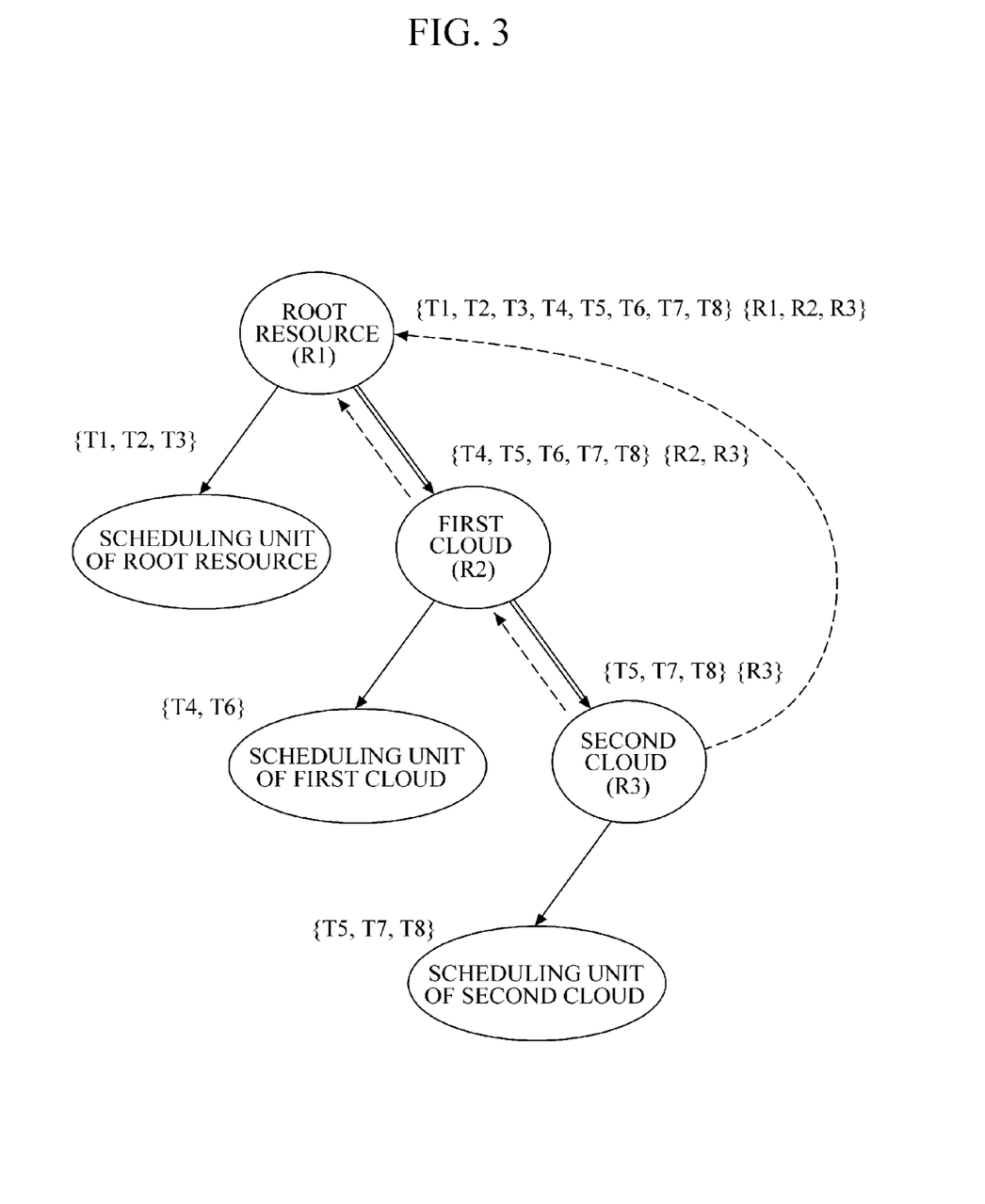
FIG. 3 is a view for explaining an example of distributively scheduling tasks of an application program.

FIG. 2 shows an example of a task graph of an application program, and FIG. 3 is a view for explaining an example of distributively scheduling tasks of an application program.

In FIG. 2, the task graph includes 8 tasks T1 through T8 of the application program that are to be scheduled. A root resource R1 allocates the 8 tasks T1 through T8 to itself and a first cloud resource R2 and a second cloud resource R3 that are managed by the root resource R1 so the root resource R1, the first cloud resource R2, and the second cloud resource R3 can schedule their allocated tasks. In this example, the root resource R1 stores a list of resources R1, R2, and R3 under its management, and a list of the tasks T1 through T8 that are to be scheduled.

Referring to FIG. 3, in this example, the root resource R1 allocates the tasks T1, T2, and T3 to itself, allocates the tasks T4 and T6 to the first cloud resource R2, and allocates the tasks T5, T7, and T8 to the second cloud resource R3. Then, the root resource R1 schedules the tasks T1, T2, and T3, which are local tasks allocated to itself, using a scheduling unit of the root resource R1, and provides the first cloud resource R2 with a list of the remaining tasks T4 through T8 and a list of resources (in this example, the first cloud resource R2 and the second cloud resource R3) to which the tasks T4 through T8 can be redelegated, thereby delegating scheduling authority for the tasks T4 though T8 to the first cloud resource R2. The first cloud resource R2 checks its lower resource (in this example, the second cloud resource R3) in the received list of resources, schedules the tasks T4 and T6 using a scheduling unit of the first cloud resource R2, and redelegates scheduling authority for the remaining tasks T5, T7, and T8 to the second cloud resource R3 according to the states of the first cloud resource R2 and the second cloud resource R3. The second cloud resource R3 schedules the tasks T5, T7, and T8 using a scheduling unit of the second cloud resource R3. In this description, a lower resource of a given resource is a next lowest resource with respect to the given resource in a hierarchy of resources, i.e., a resource that is one level lower in the hierarchy than the given resource. Each resource except a lowest resource may have one or more lower resources.

Dashed arrows in FIG. 3 represent schedule reconfiguration requests that are issued by the first cloud resource R2 and the second cloud resource R3 to their respective upper resources R1 and R2, and by the second cloud resource R3 to the root resource R1, when the first cloud resource R2 and the second cloud resource R3 cannot perform the scheduling delegated by their respective upper resources R1 and R2 due to changes in the states of the first cloud resource R2 and the second cloud resource R3. That is, a given resource may request its upper resource, or a root resource (the most significant resource), or both its upper resource and the root resource, to reconfigure a schedule. However, this is only an example, and it is also possible that a given resource may request two or more peripheral resources to reconfigure a schedule according to a policy or the states of the peripheral resources. In this description, an upper resource of a given resource is a next higher resource with respect to the given resource in a hierarchy of resources, i.e., a resource that is one level higher in the hierarchy than the given resource. Each resource except a root resource may have one or more upper resources.

Figure 4:
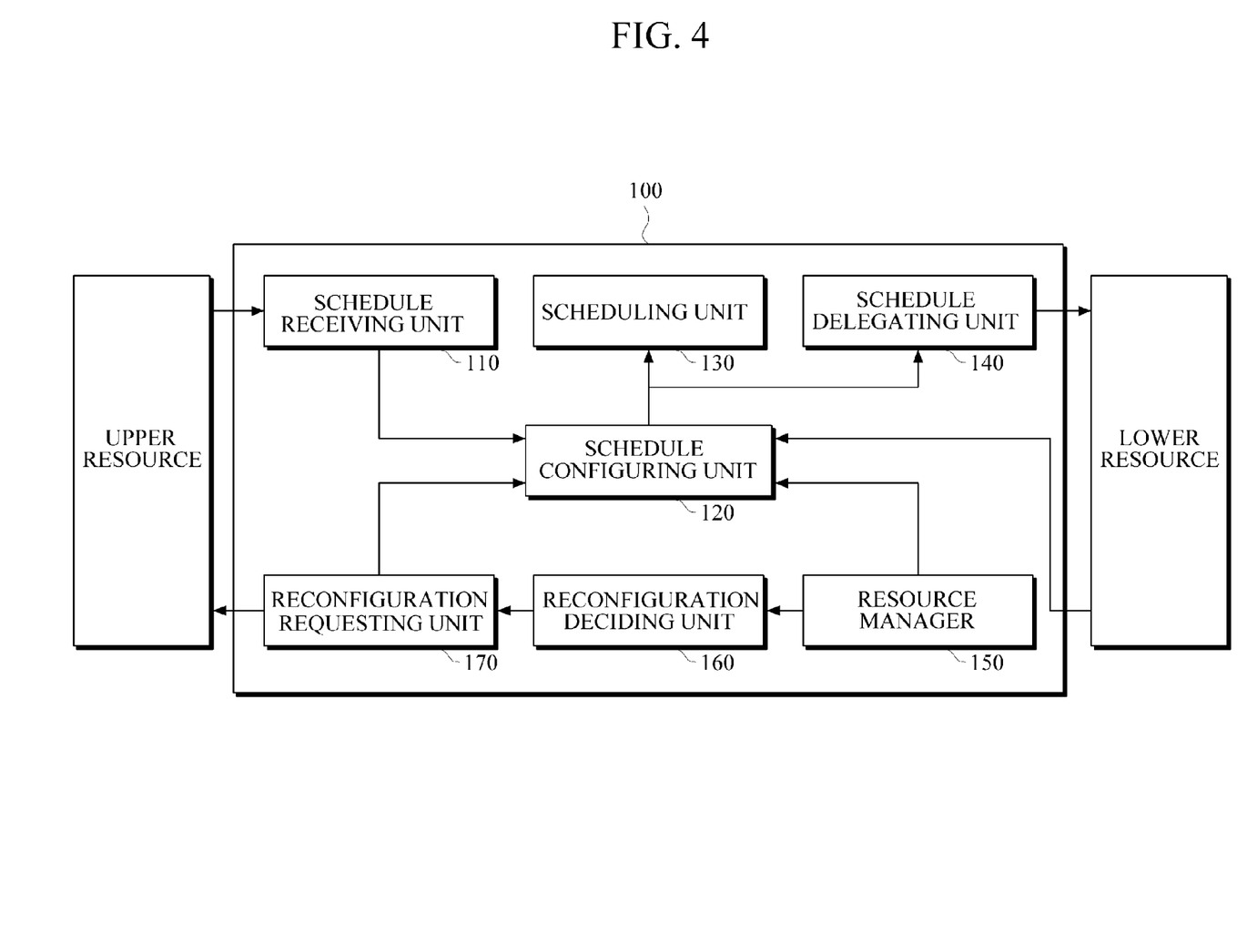
FIG. 4 is a diagram illustrating an example of a hierarchical scheduling apparatus for a cloud environment.

FIG. 4 is a diagram illustrating an example of a hierarchical scheduling apparatus 100 for a cloud environment. Referring to FIG. 4, the hierarchical scheduling apparatus 100 is a root resource or a lower resource that has been delegated scheduling authority by the root resource, and includes a schedule configuring unit 120, a scheduling unit 130, and a schedule delegating unit 140. Although FIG. 4 shows that the hierarchical scheduling apparatus 100 has an upper resource and a lower resource, if the hierarchical scheduling apparatus 100 is a root resource, it will not have an upper resource because a root resource is the most significant resource, i.e., the highest resource in a hierarchy of resources. Also, if the hierarchical scheduling apparatus 100 is a lowest resource in the hierarchy of resources, it will not have a lower resource.

The schedule configuring unit 120 classifies tasks into local tasks and remote tasks to configure a schedule. The local tasks are tasks that are to be scheduled directly by the scheduling unit 130, and the remote tasks are tasks that are to be delegated to other resources.

In the example in FIG. 4, the hierarchical scheduling apparatus 100 also includes a resource manager 150. The resource manager 150 collects state information of resources that are managed by the resource manager 150, including the hierarchical scheduling apparatus 100 itself, and monitors changes in states of the resources in real time based on the state information of the resources. The state information of the resources may include information regarding a scheduling time according to a computing performance of each resource, information regarding a remaining battery capacity of each resource, ownership information of each resource, and any other information about each resource that may be useful in determining whether each resource is available for performing tasks.

The schedule configuring unit 120 determines whether or not the resources that are managed by the resource manager 150 are available based on the state information of the resources collected by the resource manager 150, and allocates tasks to at least one available resource of the resources that are managed by the resource manager 150. The schedule configuring unit 120 requests the resource manager 150 to collect state information of the resources in real time so the schedule configuring unit 120 can use the state information of the resources to configure a schedule.

The schedule configuring unit 120 determines which resources are available among all resources that are managed by the resource manager 150 based on the state information of the resources collected by the resource manager 150, and distributes tasks to the available resources. In this description, the term "available resources" is used for convenience, and covers both a situation in which a plurality of resources are available, and a situation in which only one resource is available. Thus, "available resources" is to be interpreted as meaning "at least one available resource."

The schedule configuring unit 120 of a lower resource that has been delegated scheduling authority for some tasks by an upper resource determines available resources among resources included in a list of resources that the lower resource has received from the upper resource for use in configuring a schedule, and redelegates scheduling authority for the tasks to the available resources.

If the hierarchical scheduling apparatus 100 of the lower resource is in a good state, i.e., if it has enough capacity to perform all of the tasks for which the lower resource has been delegated scheduling authority, the schedule configuring unit 120 of the lower resource configures a schedule in which all of the tasks are allocated to the lower resource so the scheduling unit 130 of the lower resource schedules all of the tasks without redelegating scheduling authority for any of the tasks to other resources. Alternatively, if the hierarchical scheduling apparatus 100 of the lower resource is in a poor state, i.e., if it does not have enough capacity to perform all of the tasks for which the lower resource has been delegated scheduling authority, the schedule configuring unit 120 of the lower resource configures a schedule in which one or more lower resources of the lower resource that are in a good state are allocated some or all of the tasks. In this description, "lower resources" of a given resource are resources that are at different lower levels with respect to the given resource in a hierarchy of resources, and may include a resource that is a next lower resource with respect to the given resource in the hierarchy of resources. Then, the scheduling unit 130 of the lower resource schedules any local tasks that the schedule configuring unit 120 of the lower resource has allocated to the lower resource.

The schedule delegating unit 140 transmits, to a lower resource, a list of remote tasks that are to be scheduled by other resources and a list of resources to which the remote tasks are to be redelegated. In the example in FIG. 4, the hierarchical scheduling apparatus 100 further includes a schedule receiving unit 110 for receiving a list of tasks and a list of resources from a schedule delegating unit 140 of an upper resource. The schedule receiving unit 110 of the lower resource that has received the list of tasks and the list of resources from the schedule delegating unit 140 of the upper resource requests the schedule configuring unit 120 to configure a schedule.

In response to a request from the schedule receiving unit 110 of the lower resource that has been delegated scheduling authority by the schedule delegating unit 140 of the upper resource, the schedule configuring unit 120 classifies the delegated tasks into local tasks and remote tasks. In this way, by performing a hierarchical, distributed scheduling based on a task graph structure of an application program, it is possible to efficiently schedule tasks based on states of resources, resulting in a significant reduction in a scheduling time.

In the example in FIG. 4, the hierarchical scheduling apparatus 100 further includes a reconfiguration deciding unit 160 and a reconfiguration requesting unit 170.

When the state of the hierarchical scheduling apparatus 100 changes, the reconfiguration deciding unit 160 decides whether to request the schedule configuring unit 120 to reallocate tasks, through the schedule configuring unit 120, or whether to request a predetermined resource to reconfigure a schedule to reallocate the tasks to other resources. In response to the decision of the reconfiguration deciding unit 160, the reconfiguration requesting unit 170 requests the schedule configuring unit 120 to reallocate the tasks, or requests the predetermined resource to reconfigure a schedule to reallocate the tasks to the other resources.

If the resource manager 150 detects a change in states of resources that are managed by the resource manager 150, including the hierarchical scheduling apparatus 100 itself, the reconfiguration deciding unit 160 determines whether scheduling can be performed by the hierarchical scheduling apparatus 100 and its lower resource based on the states of the hierarchical scheduling apparatus 100 and the lower resource. If the reconfiguration deciding unit 160 determines that scheduling can be performed by the hierarchical scheduling apparatus 100 and its lower resource, the reconfiguration requesting unit 170 requests the schedule configuring unit 120 to reallocate the tasks for which scheduling authority has been delegated to the hierarchical scheduling apparatus 100. If the reconfiguration deciding unit 160 determines that scheduling cannot be performed by the hierarchical scheduling apparatus 100 and its lower resource, the reconfiguration requesting unit 170 requests a predetermined resource to reconfigure a schedule to reallocate the tasks to other resources.

The schedule receiving unit 110 receives information about the predetermined resource for requesting reconfiguration of a schedule from the upper resource that has delegated scheduling authority to the lower resource. The schedule delegating unit 140 of the upper resource transmits, to the schedule receiving unit 110 of the lower resource, the information about the predetermined resource for requesting reconfiguration of a schedule when there is a change in a state of the lower resource, as well as a list of tasks and a list of resources.

For example, referring to FIG. 3, the resource R2 transmits, to its lower resource R3, information about the resource R2 as information about a resource to which the lower resource R3 is to transmit a schedule reconfiguration request. If the resource R2 determines that the resource R2 is no longer available for scheduling, the resource R2 transmits, to its lower resource R3, information about its upper resource R1 or the most significant resource (in this example, the root resource R1) as information about a resource to which the lower resource R3 is to transmit a schedule reconfiguration request. However, it is also possible to store, in each resource, information about its upper resource as information about a resource to which each resource is to transmit a schedule reconfiguration request.

If a given resource cannot perform scheduling due to a change in its state, the given resource requests its upper resource to reconfigure a schedule, and then the upper resource determines, depending on whether the upper resource and its lower resources are available, whether to reallocate tasks, or whether to request its upper resource to reconfigure a schedule.

The given resource and the upper resource of the given resource may have the same configuration as the hierarchical scheduling apparatus 100 in FIG. 4. When the schedule configuring unit 120 of the upper resource of the given resource receives a request to reconfigure a schedule from the reconfiguration requesting unit 170 of the given resource and the reconfiguration deciding unit 160 of the upper resource of the given resource detects that the state of the hierarchical scheduling apparatus 100 of the upper resource of the given resource has changed based on the state information of the hierarchical scheduling apparatus 100 of the upper resource of the given resource, the reconfiguration deciding unit 160 of the upper resource of the given resource decides whether to request the schedule configuring unit 120 of the upper resource of the given resource to reconfigure the schedule by reallocating tasks, or whether to request a predetermined resource to reconfigure the schedule. The reconfiguration requesting unit 170 of the upper resource of the given resource requests the schedule configuring unit 120 of the upper resource of the given resource to reallocate tasks, or requests the predetermined resource to reconfigure the schedule, depending on a decision of the reconfiguration deciding unit 160 of the upper resource of the given resource.

By hierarchically deciding whether to reconfigure a schedule, it is unnecessary to reconfigure a schedule of all tasks when there is a change in states of resources so resources can be efficiently used, resulting in a reduction of a scheduling time. However, this is only an example, and it is also possible for the given resource to directly request the most significant resource to perform reconfigure a schedule, or to simultaneously request a plurality of resources to reconfigure a schedule according to the states of the plurality of resources.

Figure 5:
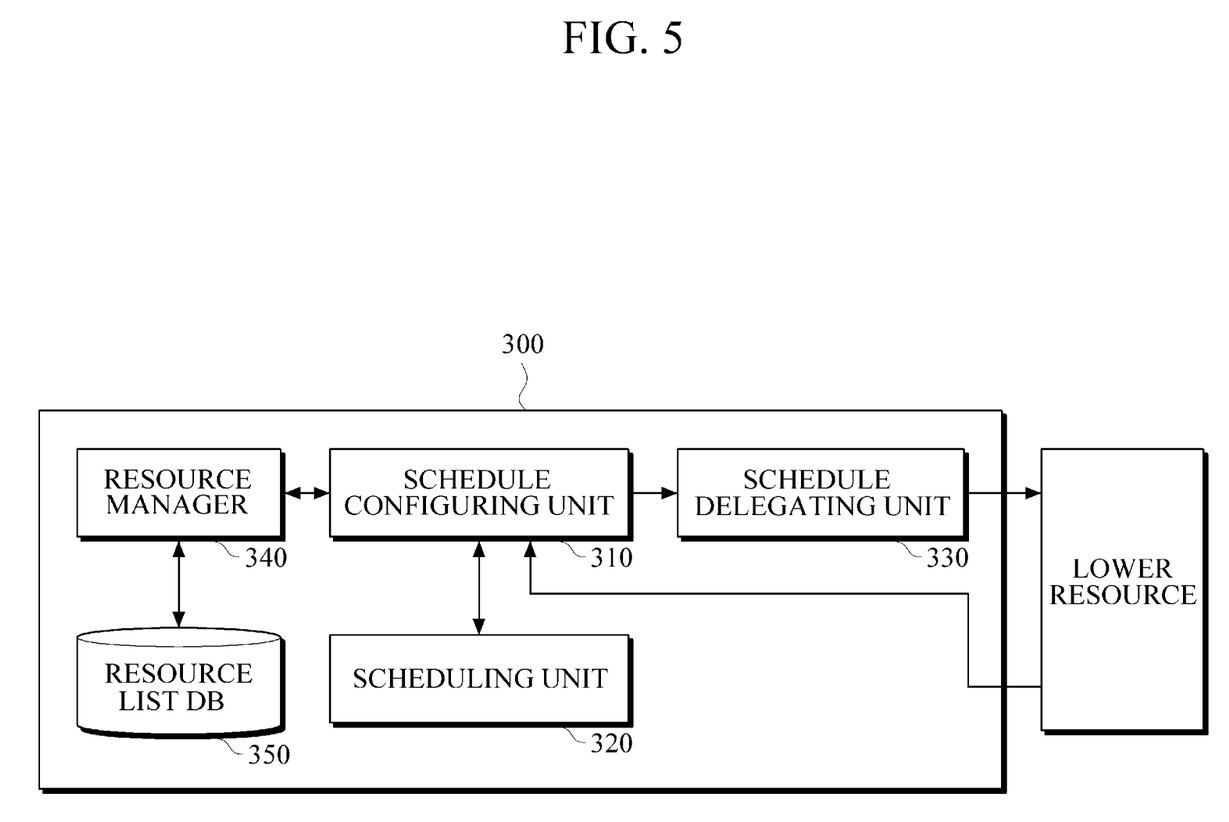
FIG. 5 is a diagram illustrating an example of a hierarchical scheduling apparatus for a cloud environment.

FIG. 5 is a diagram illustrating an example of a hierarchical scheduling apparatus 300 for a mobile cloud environment. The hierarchical scheduling apparatus 300 illustrated in FIG. 5 is used as a root resource, and accordingly has a lower resource, but does not have an upper resource. Referring to FIG. 5, the hierarchical scheduling apparatus 300 includes a schedule configuring unit 310, a scheduling unit 320, a schedule delegating unit 330, and a resource manager 340. The resource manager 340 manages resources to which scheduling authority can be delegated, collects state information of the resources in real time, including the hierarchical scheduling apparatus 300 itself, and monitors whether there is a change in states of the resources.

In the example in FIG. 5, the hierarchical scheduling apparatus 300 further includes a resource list database (DB) 350. The resource list DB 350 stores a list of all root resources of the hierarchical scheduling apparatus 300, a list of resources of other apparatuses, information about the ownerships, scheduling times, remaining battery capacities, of the resources, and any other information about the resources that may be useful in determining whether the resources are available for performing tasks. The resource manager 340 stores the state information of the various resources in the resource list DB 350.

The schedule configuring unit 310 requests the resource manager 340 to collect the state information of the resources managed by the resource manager 340 in real time. Also, the schedule configuring unit 310 determines whether the resources managed by the resource manager 340 are available based on the state information of the resources collected in real time by the resource manager 340 and stored in the resource list DB 350, and allocates tasks to available ones of the resources. The schedule configuring unit 310 determines whether the resources managed by the resource manager 340 are available based on resource state information collected by the resource manager 340 in real time and stored in the resource list DB 350.

If the hierarchical scheduling apparatus 300 is in a good state, the schedule configuring unit 310 configures a schedule in which all of the tasks are allocated to the hierarchical scheduling apparatus 300 so the scheduling unit 320 schedules all of the tasks without delegating scheduling authority for any of the tasks to other resources. Alternatively, if the hierarchical scheduling apparatus 300 is in a poor state, the schedule configuring unit 310 configures a schedule in which one or more lower resources that are in a good state are allocated some or all of the tasks. Then, the scheduling unit 320 schedules any local tasks that the schedule configuring unit 310 has allocated to the hierarchical scheduling apparatus 300.

The schedule delegating unit 330 transmits, to a lower resource, a list of remote tasks that are to be scheduled by other resources and a list of resources that are to schedule the remote tasks, thereby delegating scheduling authority for the remote tasks to the lower resource.

Figure 6:
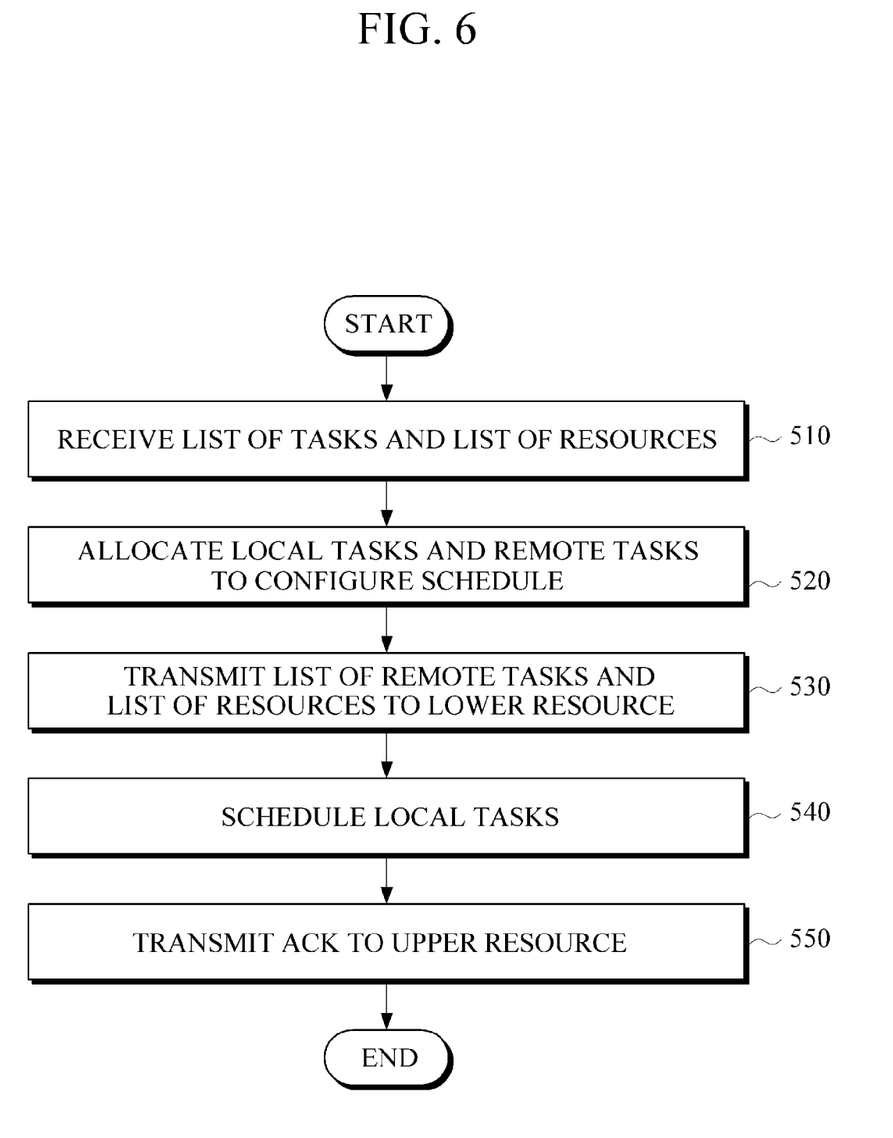
FIG. 6 is a flowchart illustrating an example of a hierarchical scheduling method for a cloud environment.
Figure 7:
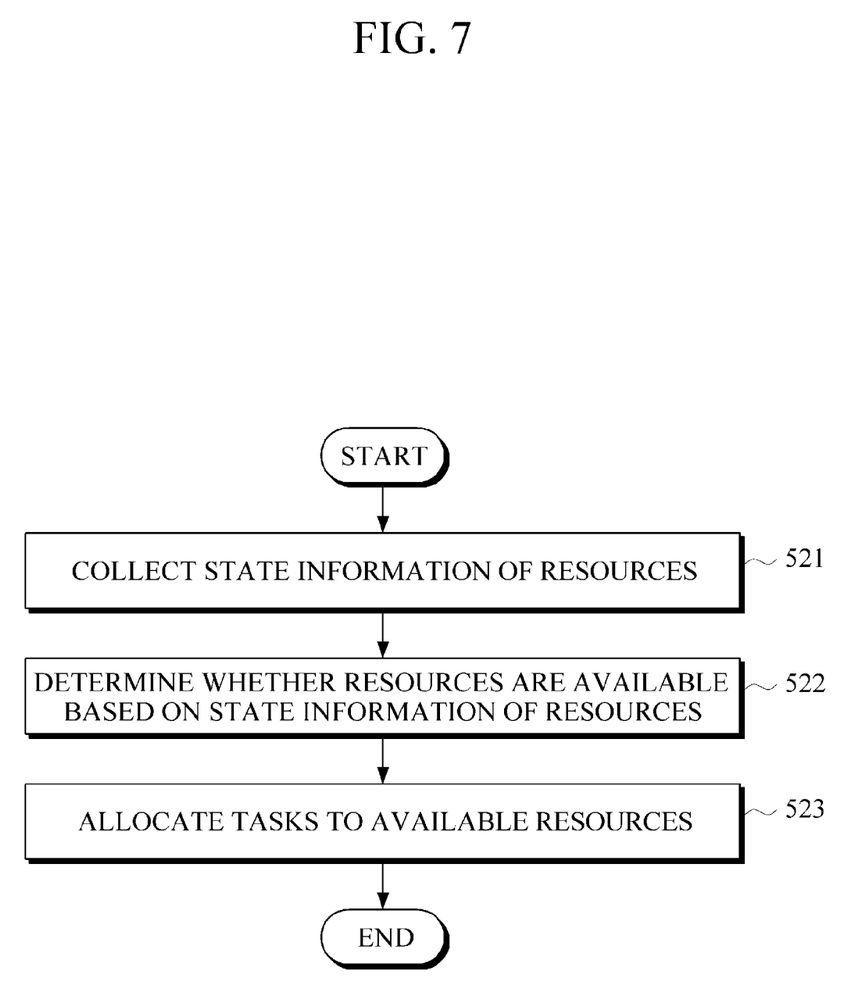
FIG. 7 is a flowchart illustrating a scheduling operation in the hierarchical scheduling method illustrated in FIG. 6.

FIG. 6 is a flowchart illustrating an example of a hierarchical scheduling method for a mobile cloud environment, and FIG. 7 is a flowchart illustrating a scheduling operation (520) in the hierarchical scheduling method illustrated in FIG. 6. Hereinafter, a hierarchical scheduling method will be described with reference to FIGS. 4, 6, and 7.

First, the schedule receiving unit 110 of the hierarchical scheduling apparatus 100 receives a list of tasks and a list of resources from an upper resource that has delegated scheduling authority for the tasks to the hierarchical scheduling apparatus 100 (510). However, if the schedule receiving unit 110 is a root resource, there is no upper resource, so the scheduling receiving unit 110 maintains a list of tasks that are to be scheduled and a list of resources that are managed by the resource manager 150.

Then, the schedule configuring unit 120 classifies the tasks into local tasks and remote tasks, thereby configuring a schedule, wherein the local tasks are tasks that are to be scheduled directly by the schedule configuring unit 120, and the remote tasks are tasks that are to be scheduled by other resources (520). In doing this, the schedule configuring unit 120 uses a list of tasks and a list of resources, which are maintained by the schedule receiving unit 110 in a root resource or are received from an upper resource in a lower resource, to classify the tasks into local tasks that are to be scheduled directly by the schedule configuring unit 120 and remote tasks that are to be scheduled by other resources, thereby configuring a schedule.

The scheduling operation (520) in FIG. 6 is shown in greater detail in FIG. 7. The schedule configuring unit 120 requests the resource manager 150 to collect state information of resources (521), including the hierarchical scheduling apparatus 100 itself. If the hierarchical scheduling apparatus 100 is a root resource, the resources are resources included in the list of resources maintained by the schedule receiving unit 110 of the root resource, and if the hierarchical scheduling apparatus 100 is a lower resource, the resources are resources included in the list of resources that the lower resource received from the upper resource.

Then, the schedule configuring unit 120 determines whether the resources are available based on the state information of the resources collected by the resource manager 150 (522), and allocates the tasks to available resources (523). The schedule configuring unit 120 may configure a schedule according to the state of the hierarchical scheduling apparatus 100 so all of the tasks are scheduled by the scheduling unit 130 without delegating scheduling authority for any of the tasks to other resources.

Then, referring again to FIG. 6, the schedule delegating unit 140 transmits, to a lower resource, a list of the remote tasks and a list of resources to which the remote tasks are to be allocated, thereby delegating scheduling authority for the tasks to the lower resource.

Finally, the scheduling unit 130 schedules the local tasks (540). If the hierarchical scheduling apparatus 100 is not a root resource, the scheduling unit 130 transmits an ACK (acknowledgement message) to the upper resource that has delegated scheduling authority for the local tasks to the hierarchical scheduling apparatus 100 (550).

Figure 8:
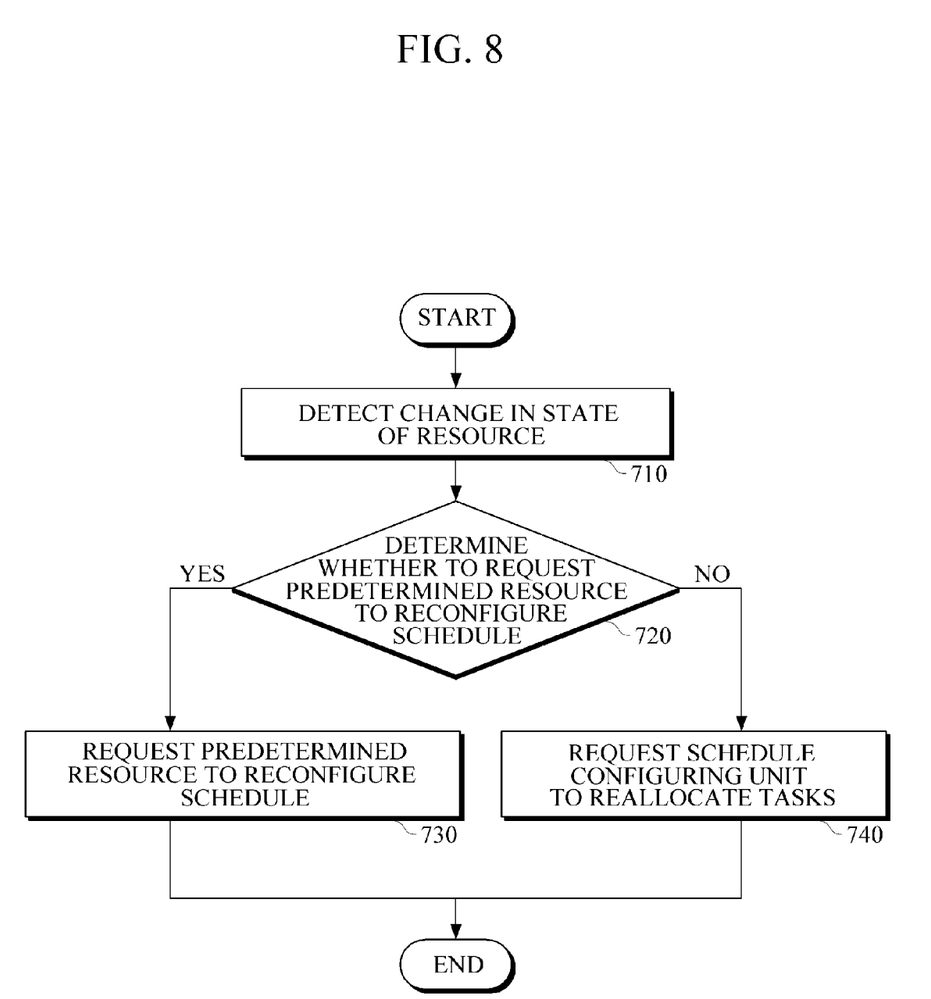
FIG. 8 is a flowchart illustrating a procedure of requesting reconfiguration of a schedule when the state of a resource changes in the hierarchical scheduling method illustrated in FIG. 6.

FIG. 8 is a flowchart illustrating a procedure of requesting reconfiguration of a schedule when the state of a resource changes in the hierarchical scheduling method illustrated in FIG. 6. The procedure is performed to reconfigure a schedule when scheduling cannot be performed by a lower resource that has been delegated scheduling authority by an upper resource due to a change in a state of the lower resource.

The lower resource that has been delegated scheduling authority by the upper resource detects a change in the state of the lower resource (710). Then, if tasks have to be reallocated due to the change in the state of the lower resource, or if a request for reconfiguring a schedule has been received from a lower resource of the lower resource, the lower resource determines whether to request a predetermined resource to reconfigure a schedule to reallocate the tasks to other resources, or whether the tasks can be reallocated by the lower resource or its lower resource in light of the states of the lower resource and its lower resource (720).

If the tasks cannot be reallocated by the lower resource or its lower resource, the lower resource requests a predetermined resource to reconfigure a schedule so that the tasks are reallocated to other resources (730). Information about the predetermined resource is transmitted from the upper resource to the lower resource, together with a list of tasks and a list of resources. The predetermined resource may be a root resource or the upper resource of the lower resource.

Alternatively, if the tasks can be reallocated by the lower resource or its lower resource, the lower resource requests its schedule configuring unit 120 (see FIG. 4) to reallocate the tasks (740).

According to the examples described above, by using a hierarchical rescheduling technique, it is unnecessary to reschedule all tasks when the state of a resource changes, which reduces a scheduling load, and also resources can be efficiently used, which reduces a scheduling time.

The schedule receiving unit 110, the schedule configuring unit 120, the scheduling unit 130, the schedule delegating unit 140, the resource manager 150, the reconfiguration deciding unit 160, the reconfiguration requesting unit 170, the schedule configuring unit 310, the scheduling unit 320, the schedule delegating unit 330, and resource manager 340, and the resource list database 350 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, wireless adapters, network adapters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A hierarchical scheduling apparatus comprising a processor for a cloud environment, the hierarchical scheduling apparatus comprising:
 a schedule configuring unit configured to utilize state information of resources that are managed by the hierarchical scheduling apparatus in the cloud environment to determine a list of available resources and classify at least one of tasks within a scheduling unit and tasks received from an upper resource into a list of one or more local tasks and a list of one or more remote tasks by using the list of available resources and the state information, wherein the state information comprises at least state information of the hierarchical scheduling apparatus itself;

a schedule delegating unit configured to transmit, to a lower resource in the list of available resources, the list of the one or more remote tasks and the list of available resources to delegate scheduling authority for the list of the one or more remote tasks to the lower resource; and a scheduling unit configured to schedule the list of one or more local tasks, wherein the hierarchical scheduling apparatus and the lower resource are arranged with respect to one another in a hierarchy of the resources in the cloud environment.

2. The hierarchical scheduling apparatus of claim 1, further comprising a resource manager configured to collect state information of the resources;

wherein the schedule configuring unit is further configured to:
determine whether the resources are available based on the collected state information of the resources; and
allocate the remote tasks to at least one available resource of the resources.

3. The hierarchical scheduling apparatus of claim 2, wherein the state information of the resources comprises information regarding a scheduling time according to a computing performance of each of the resources, or information regarding a remaining battery capacity of each of the resources, or ownership information of each of the resources, or any combination thereof.

4. The hierarchical scheduling apparatus of claim 2, wherein the resource manager is further configured to detect a change in a state of the hierarchical scheduling apparatus; and the hierarchical scheduling apparatus further comprises:
a reconfiguration deciding unit configured to decide, when the resource manager detects a change in the state of the hierarchical scheduling apparatus, whether to request the schedule configuring unit to reallocate the tasks, or whether to request a predetermined resource to reconfigure a schedule; and
a reconfiguration requesting unit configured to request the schedule configuring unit to reallocate the tasks, or to request the predetermined resource to reconfigure the schedule, depending on a decision of the reconfiguration deciding unit.

5. The hierarchical scheduling apparatus of claim 4, further comprising a schedule receiving unit configured to receive information about the predetermined resource from an upper resource that has delegated scheduling authority for the tasks to the hierarchical scheduling apparatus.

6. The hierarchical scheduling apparatus of claim 4, wherein the predetermined resource is an upper resource that has delegated scheduling authority for the tasks to the hierarchical scheduling apparatus, or an upper resource of the upper resource, or a most significant resource.

7. The hierarchical scheduling apparatus of claim 1, wherein the lower resource comprises a shared sensor, or a mobile terminal, or a cloud server, or any combination thereof, connected to the hierarchical scheduling apparatus through a wired network, or a wireless network, or a combination of a wired network and a wireless network.

8. A hierarchical scheduling method for a cloud environment, the hierarchical scheduling method comprising:
utilizing state information of at least one of a plurality of resources in the cloud environment to determine a list of available resources;
classifying at least one of tasks within a scheduling unit and tasks received from an upper resource into a list of one or more local tasks and a list of one or more remote tasks by using the list of available resources;
transmitting, to a lower resource in the list of available resources, the list of the remote tasks and the list of available resources to delegate scheduling authority for the list of the one or more remote tasks to the lower resource; and
scheduling the list of one or more local tasks,
wherein the at least one of the plurality of resources and the lower resource are arranged with respect to one another in a hierarchy of the resources in the cloud environment.

9. The hierarchical scheduling method of claim 8, further comprising collecting state information of the resources; and
wherein the classifying of the plurality of tasks comprises:
determining whether the resources are available based on the collected state information of the resources; and
allocating the remote tasks to at least one available resource of the resources.

10. The hierarchical scheduling method of claim 9, wherein the state information of the resources comprises information regarding a scheduling time according to a computing performance of each of the resources, or information regarding a remaining battery capacity of each of the resources, or ownership information of each of the resources, or any combination thereof.

11. The hierarchical scheduling method of claim 9, further comprising:
detecting a change in a state of a resource performing the hierarchical scheduling method;
deciding, when a change in the state of the resource performing the hierarchical scheduling method is detected, whether to reallocate the tasks, or whether to request a predetermined resource to reconfigure a schedule; and
reallocating the tasks, or requesting the predetermined resource to reconfigure the schedule, depending on a result of the deciding.

12. The hierarchical scheduling method of claim 11, wherein the predetermined resource is an upper resource that has delegated scheduling authority for the tasks to the resource performing the hierarchical scheduling method, or an upper resource of the upper resource, or a most significant resource.

13. A hierarchical scheduling apparatus comprising a processor for a cloud environment, the hierarchical scheduling apparatus comprising:
a schedule configuring unit configured to:
utilize state information of resources that are managed by the hierarchical scheduling apparatus in the cloud environment to determine a list of available resources;
allocate at least some tasks as remote tasks to a lower resource of the hierarchical scheduling apparatus in the list of available resources;
receive a request from the lower resource to reallocate the allocated tasks; and
reallocate at least some of the tasks requested to be reallocated to another lower resource within the list of available resources; and
a schedule delegating unit configured to delegate scheduling authority for the reallocated tasks to the another lower resource,
wherein the hierarchical scheduling apparatus and the lower resources are arranged with respect to one another in a hierarchy of the resources in the cloud environment.

14. The hierarchical scheduling apparatus of claim 13, wherein the schedule configuring unit is further configured to allocate at least some of the remote tasks to the hierarchical scheduling apparatus as local tasks; and the hierarchical scheduling apparatus further comprises a scheduling unit configured to schedule the local tasks.

15. The hierarchical scheduling apparatus of claim 13, wherein the schedule configuring unit is further configured to allocate tasks to the hierarchical scheduling apparatus as local tasks; and the hierarchical scheduling apparatus further comprises a scheduling unit configured to schedule the local tasks.

16. The hierarchical scheduling apparatus of claim 15, further comprising a schedule receiving unit configured to receive a list of tasks and a list of resources from an upper resource that has delegated scheduling authority for the tasks in the list of tasks to the hierarchical scheduling apparatus;

wherein the schedule configuring unit is further configured to classify the tasks in the list of tasks into the local tasks and the remote tasks.

17. The hierarchical scheduling apparatus of claim 16, further comprising:

a reconfiguration deciding unit configured to decide, when a state of the hierarchical scheduling apparatus has changed, whether to request the schedule configuring unit to reallocate at least some of the local tasks to the lower resource in the list of available resources, or whether to request a predetermined resource to reallocate the at least some of the local tasks; and a reconfiguration requesting unit configured to request the schedule configuring unit to reallocate the at least some of the local tasks, or to request the predetermined resource to reallocate the at least some of the local tasks, depending on a decision of the reconfiguration deciding unit.

18. The hierarchical scheduling apparatus of claim 17, further comprising a resource manager configured to collect state information of the hierarchical scheduling apparatus;

wherein the reconfiguration deciding unit is further configured to detect that a state of the hierarchical scheduling apparatus has changed based on the state information of the hierarchical scheduling apparatus.

19. The hierarchical scheduling apparatus of claim 13, further comprising a resource manager configured to collect state information of a plurality of resources;

wherein schedule configuring unit is further configured to allocate the tasks and reallocate the at least some of the tasks based on the state information collected by the resource manager.

20. The hierarchical scheduling apparatus of claim 19, wherein the state information collected by the resource manager comprises state information of the hierarchical scheduling apparatus; and the hierarchical scheduling apparatus further comprises:

a reconfiguration deciding unit configured to:

detect whether a state of the hierarchical scheduling apparatus has changed based on the state information of the hierarchical scheduling apparatus; and decide, when the reconfiguration deciding unit detects that the state of the hierarchical scheduling apparatus has changed, whether to request the schedule configuring unit to reallocate the at least some of the tasks to the another lower resource, or whether to request a predetermined resource to reallocate the at least some of the tasks; and a reconfiguration requesting unit configured to request the schedule configuring unit to reallocate the at least some of the tasks to the another lower resource, or to request the predetermined resource to reallocate the at least some of the tasks, depending on a decision of the reconfiguration deciding unit.

\* \* \* \* \*